(12) United States Patent
Null et al.

(10) Patent No.: US 8,894,118 B2
(45) Date of Patent: Nov. 25, 2014

(54) GRIPPER WITH CABLE SYNCHRONIZED JAW MOVEMENT

(71) Applicant: PHD, Inc., Fort Wayne, IN (US)

(72) Inventors: Lyle A. Null, Markle, IN (US); Matthew R. Williams, Fort Wayne, IN (US)

(73) Assignee: PHD, Inc., Fort Wayne, IN (US)

( * ) Notice: Subject to any disclaimer, the term of this patent is extended or adjusted under 35 U.S.C. 154(b) by 0 days.

(21) Appl. No.: 14/049,616

(22) Filed: Oct. 9, 2013

(65) Prior Publication Data

US 2014/0097632 A1    Apr. 10, 2014

Related U.S. Application Data

(60) Provisional application No. 61/711,457, filed on Oct. 9, 2012.

(51) Int. Cl.
| | | |
|---|---|---|
| *B25J 15/00* | (2006.01) | |
| *B25J 15/08* | (2006.01) | |
| *B25J 15/02* | (2006.01) | |

(52) U.S. Cl.
CPC ............ *B25J 15/0028* (2013.01); *B25J 15/086* (2013.01); *B25J 15/0293* (2013.01)
USPC ........................................ 294/207; 294/119.1

(58) Field of Classification Search
CPC ............... B25J 15/0028; B25J 15/0253; B25J 15/0286; B25J 15/0293; B25J 15/086
USPC ........ 294/207, 119.1; 901/37; 269/25–27, 32, 269/33
See application file for complete search history.

(56) References Cited

U.S. PATENT DOCUMENTS

| | | | |
|---|---|---|---|
| 4,336,926 A | | 6/1982 | Inagaki et al. |
| 5,106,138 A | * | 4/1992 | Lawson ............................ 294/2 |
| 5,150,937 A | * | 9/1992 | Yakou ........................ 294/119.1 |
| 5,529,359 A | | 6/1996 | Borcea et al. |
| 5,595,413 A | * | 1/1997 | McGeachy et al. ........... 294/207 |
| 6,224,123 B1 | | 5/2001 | Ubele et al. |
| 6,309,003 B1 | * | 10/2001 | Bertini ....................... 294/119.1 |
| 6,547,258 B2 | * | 4/2003 | Mandokoro et al. ......... 279/4.12 |
| 6,598,918 B1 | | 7/2003 | Null et al. |
| 7,490,881 B2 | | 2/2009 | Null et al. |
| 7,635,154 B2 | * | 12/2009 | Maffeis ......................... 294/207 |
| 8,585,113 B2 | * | 11/2013 | Maffeis ......................... 294/192 |

OTHER PUBLICATIONS

European Search Report Dated Dec. 20, 2013 for European Patent Application No. EP 13 00 4848 (5 pages).

* cited by examiner

*Primary Examiner* — Dean Kramer
(74) *Attorney, Agent, or Firm* — Taylor IP, P.C.

(57) ABSTRACT

A gripping device including a main body, a first elongate actuator, a second elongate actuator, a first jaw, a second jaw, a first pin, a second pin, a pair of pulleys, and a cable. The elongate actuators are both disposed in respective actuator bores within the main body and translate opposingly to each other. The jaws are both driven by a respective elongate actuator. The pins both include respective pin bodies defining a channel and are configured to drive their respective jaw by a respective elongate actuator and are disposed through transverse holes formed in the respective elongate actuator and a respective pin slot formed in the main body. The pulleys are attached to the main body. The cable forms a closed loop around the pulleys through the channels and is affixed to the first channel to inhibit relative movement between the first channel and the cable.

20 Claims, 2 Drawing Sheets

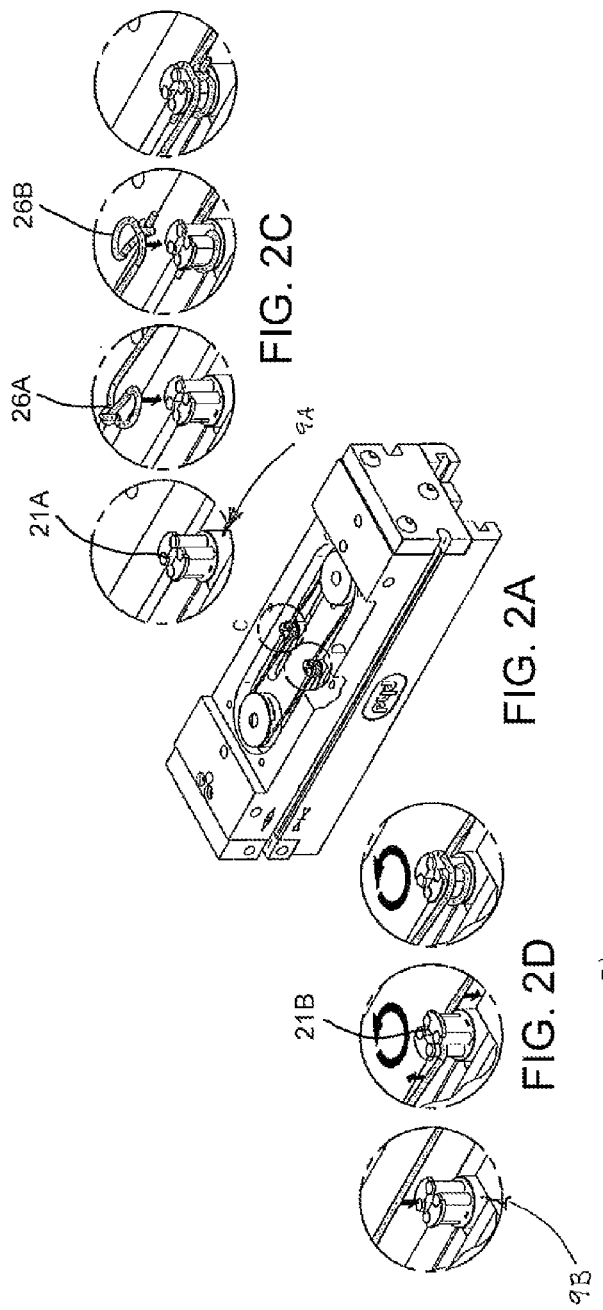
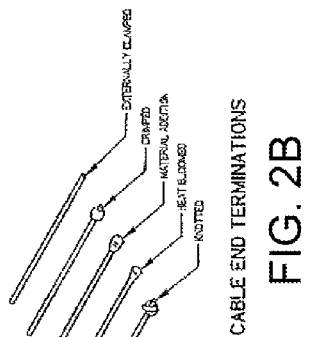

GRIPPER WITH CABLE SYNCHRONIZED JAW MOVEMENT

BACKGROUND OF THE INVENTION

1. Field of the Invention

The present invention relates to a gripping device, and, more particularly, to a gripper that includes synchronized movable jaws.

2. Description of the Related Art

Grippers are mechanical devices characterized by one or more jaws that are moved together or apart by motive means such as an electric motor or pneumatic piston. Once moved into a position of contact with the gripped workpiece, the jaws produce a gripping force against the workpiece so that the position of the workpiece might be subsequently translated or rotated. It is often desirable for the movements of the jaws to be synchronized together so that the gripped workpiece is always moved to a repeatable position coincident with the middle of the gripper, irrespective of which jaw might contact the surface of the workpiece first. Methods used in prior art to synchronize jaw motion include racks driving a common pinion, such as is disclosed by Null, et al, in U.S. Pat. No. 7,490,881 or pinned linkages, as taught by Null, et al, in U.S. Pat. No. 6,598,918. Methods used in prior art to synchronize the jaws typically result in an undesirable increase in the physical size, weight, and manufacturing cost of the gripper.

What is needed in the art is a gripper with a synchronizing mechanism that is smaller, lighter, and less expensive than those known in the art.

SUMMARY OF THE INVENTION

The present invention provides an improved gripper incorporating a cable synchronizing mechanism.

The invention in one form is directed to a gripper including a main body that contains a first actuator bore, a second actuator bore, a first pin slot located transversely to the first actuator bore, and a second pin slot located transversely to the second actuator bore. Within the first actuator bore and second actuator bore there is a first elongate actuator with a first transverse hole and a second elongate actuator with a second transverse hole, respectively. The first elongate actuator and the second elongate actuator are configured to translate opposingly to one another within their respective first actuator bore and second actuator bore. The first elongate actuator drives a first jaw and the second elongate actuator drives a second jaw. A first pin including a first pin body defining a first channel and configured to drive the first jaw by the first elongate actuator is disposed through the first transverse hole and the first pin slot. A second pin including a second pin body defining a second channel and configured to drive the second jaw by the second elongate actuator is disposed through the first transverse hole and the second pin slot. The device further includes a pair of pulleys that are attached to the main body and a cable forming a closed loop around the pair of pulleys through the first channel and the second channel. The cable is affixed to the first channel to inhibit relative movement between the cable and the first channel.

An advantage of the present invention is the gripper uses a polymer cable, which offers advantages over traditional steel cable.

BRIEF DESCRIPTION OF THE DRAWINGS

The above-mentioned and other features and advantages of this invention, and the manner of attaining them, will become more apparent and the invention will be better understood by reference to the following description of an embodiments of the invention taken in conjunction with the accompanying drawings, wherein:

FIG. 2A is an assembled perspective view of an embodiment of a synchronizing mechanism of the present invention;

FIG. 2B is an exploded view showing multiple examples of how the ends of a cable can be configured as a first end termination and a second end termination;

FIG. 2C is an exploded perspective view showing how the first end termination and the second end termination can be configured to affix the cable to a first pin to inhibit relative movement between the cable and the first pin;

FIG. 2D is an exploded perspective view showing how the cable can be wound around a pin to add a pretension to the cable; and FIG. 2E is an exploded perspective view of one embodiment of a pin and how the cable can be configured within a channel of the pin.

Corresponding reference characters indicate corresponding parts throughout the several views. The exemplification set out herein illustrates one embodiment of the invention and such exemplification is to be construed as limiting the scope of the invention in any manner.

DETAILED DESCRIPTION OF THE INVENTION

Figure 1:
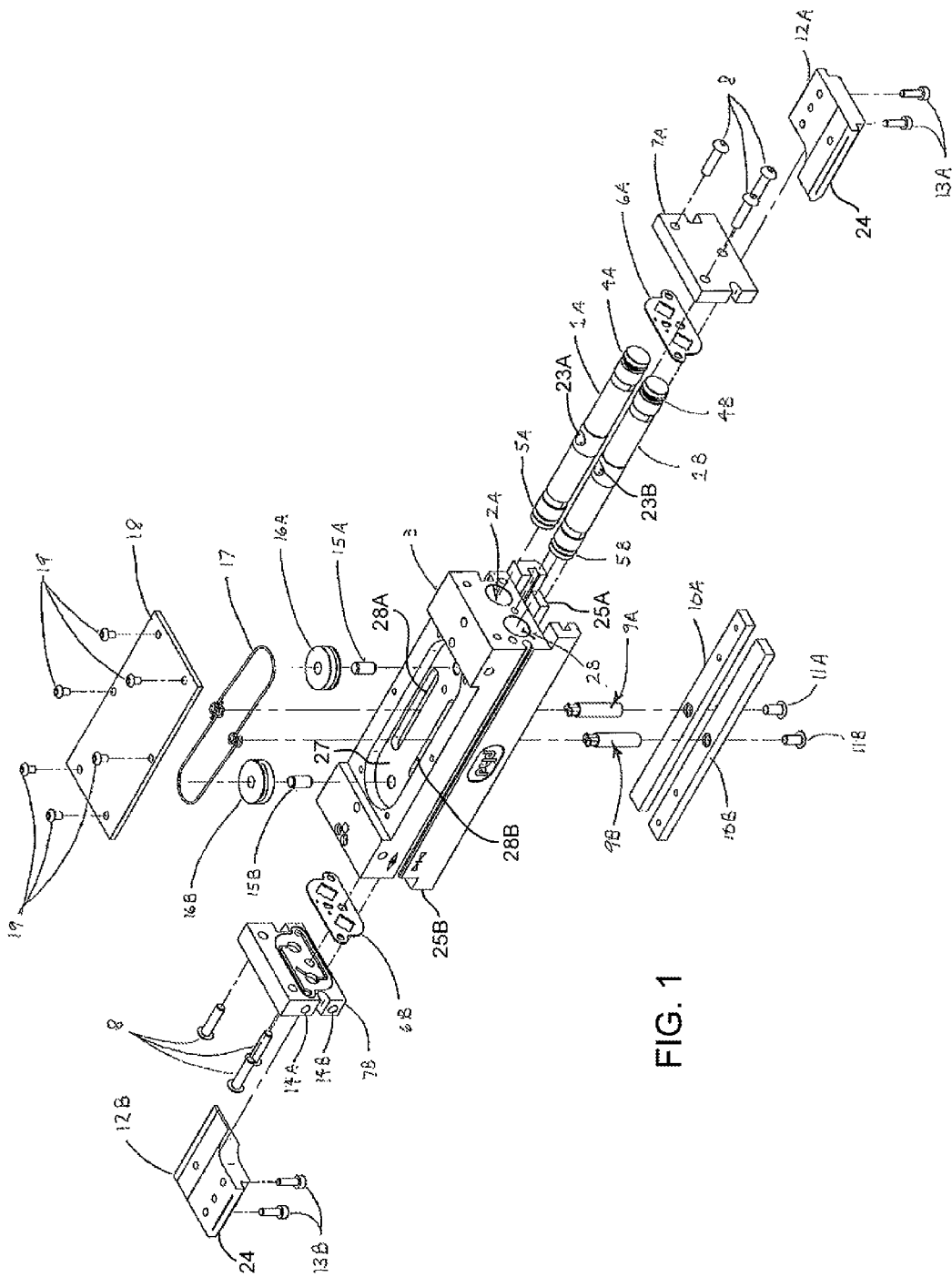
FIG. 1 is an exploded perspective view of an embodiment of the gripper of the present invention.

Referring now to the drawings, and more particularly to FIG. 1, a main body 3 includes a first actuator bore 2A and a second actuator bore 2B formed within the main body 3 going in the longitudinal direction of the main body 3. The first actuator bore 2A and second actuator bore 2B are configured to hold a first elongate actuator 1A and a second elongate actuator 1B, respectively, such that the first elongate actuator 1A and second elongate actuator 1B are free to translate unencumbered along the longitudinal axis of the bores, but are prevented from translating radially by the walls of the bores. Although first elongate actuator 1A and second elongate actuator 1B are shown as pistons in FIG. 1, those skilled in the art will appreciate that the first elongate actuator 1A and the second elongate actuator 1B can be any type of actuator capable of providing a motive force in a linear direction such as an electric motor, pneumatic actuator, or hydraulic actuator.

In a preferred embodiment using pistons as the first elongate actuator 1A and second elongate actuator 1B, a plurality of seals 4A, 5A, 4B, and 5B is included to seal the peripheries of first elongate actuator 1A and second elongate actuator 1B against the first actuator bore 2A and the second actuator bore 2B, respectively, to prevent the flow of motive compressed air around the pistons. A first gasket 6A and a second gasket 6B seal a first end cap 7A and a second end cap 7B, respectively, against the ends of the main body 3 to form a closed cavity at either end of the first elongate actuator 1A and the second elongate actuator 1B. A threaded fastener 8 attaches the first end cap 7A and the second end cap 7B to the main body 3.

A first pin 9A passes through a first transverse hole 23A in the first elongate actuator 1A and a first pin slot 28A formed in the main body 3. The first pin slot 28A should preferably have a width slightly greater than the first pin 9A and a length equal to or greater than the distance between opposing gripping elements of the gripper. The first pin 9A is attached to a first driver bar 10A with a threaded fastener 11A. A first jaw 12A is attached to the driver bar 10A with threaded fasteners 13A. In this manner, the motive force generated by compressed air acting upon the first elongate actuator 1A is transmitted to the first jaw 12A through the pin 9A and the driver bar 10A. A rib 24 protruding from the sides of the first jaw 12A is disposed into a first jaw slot 25A in the main body 3 so as to prevent the rotation of the first jaw 12A and limit the translation of the first jaw 12A in all directions except along the longitudinal axis of the main body 3. In an analogous manner, a second pin 9B passes through a second transverse hole 23B in the second elongate actuator 1B and a second pin slot 28B. The second pin slot 28B is configured similarly to the first pin slot 28A. The second pin 9B is attached to a second driver bar 10B with a threaded fastener 11B. A second jaw 12B is attached to the second driver bar 10B with threaded fasteners 13B so that the motive force generated by compressed air acting upon the second elongate actuator 1B is transmitted to the second jaw 12B through the second pin 9B and the second driver bar 10B. Similarly, a rib 24 protruding from the sides of second jaw 12B engage a second jaw slot 25B in the main body 3 to prevent the rotation of, and guide the translation of, the second jaw 12B. Those skilled in the art will recognize that the configuration of the first jaw 12A and the second jaw 12B can be suitably altered to engage various workpieces.

A first port 14A and a second port 14B allow compressed air to fill the volumes between the sealed caps 4A, 4B, 5A, 5B and the first elongate actuator 1A and the second elongate actuator 1B. Passageways are so arranged in the main body 3 and the end caps 7A, 7B to allow compressed air applied through a first port 14A or a second port 14B to produce motive pressure against opposed ends of each elongate actuator 1A, 1B. In this manner, compressed air applied to the first port 14A causes the pistons, and the jaws attached to the pistons, to move towards one another. Compressed air applied to port 14B causes the pistons and the attached jaws to move away from one another.

A first pivot pin 15A and a second pivot pin 15B are press-fit into complementary bores in the main body 3. A first pulley 16A and a second pulley 16B are disposed on top of the first pivot pin 15A and the second pivot pin 15B, respectively, so that both pulleys 16A,16B are free to rotate around the corresponding pivot pin 15A, 15B. A cable 17 is joined to the first pin 9A and the second pin 9B to form a continuous loop around the pulleys 16 such that translation of the first pin 9A causes a corresponding opposed translation of the second pin 9B. A cover 18 is attached to the main body 3 with a plurality of fasteners 19 to retain the pulleys 16 upon the first pivot pin 15A and the second pivot pin 15B.

In one embodiment, a first end termination 26A and a second end termination 26B are added to a single length of cable 17 prior to installing the cable 17 into the synchronizing mechanism. Several possibilities exist to create suitable end terminations 26A, 26B, a few examples being shown in FIG. 2B, with the choice of termination commensurate with the material from which the cable 17 is constructed. Knotted or heat-bloomed terminations are particularly well suited to polymer cables, while crimped or externally clamped terminations are typically limited to metal cables, because of the stress relaxation associated with polymers. FIG. 2E shows the construction of the end of the second pin 9B that receives the cable 17. A second channel 21B spans the length of a second pin body 20. A pair of dowel pins 22 is located on either end of the second channel 21B with the gap between the diameters of the opposing dowel pins 22 chosen to allow the diameter of the cable 17 to pass unencumbered through the second channel 21B, while restricting the end terminations 26A,26B of the cable 17 from passing through. The cylindrical body of the dowel pins 22 provides a smooth geometric transition between the portion of the cable 17 passing through the second channel 21 and the portion of the cable 17 exiting the second channel 21B to preclude cutting of the cable surface as the cable 17 is subjected to tensile loading. Although the dowel pins 22 are used to provide a smooth geometric transition, it will be understood by one skilled in the art that such a transition could also be affected by appropriately chosen blend radii between the walls of the second channel 21B and the diameter of the pin body 20, substituted for the dowel pins 22. The cable-receiving end of the first pin 9A is constructed in an analogous manner to that of the second pin 9B.

In an embodiment of the present invention, a slot 27 is provided within the main body 3 to hold the gripper synchronizing mechanism described. The slot 27 can be configured as any shape capable of substantially holding the pair of pulleys 16A,16B, cable 17, and first and second channels 21A,21B during operation. Ideally, the slot 27 is cylindrically shaped with a diameter greater than the diameter of both pulleys 16A,16B and a length greater than the distance between the centers of the pulleys 16A,16B plus the radii of the pulleys 16A,16B. The slot 27 should be arranged transversely to the pin slots 28A,28B of the main body 3 and the transverse holes 23A,23B of the elongate actuators 1A,1B.

The length of the cable 17 is chosen to exceed the perimeter distance formed by the radii of the pulleys 16 and the distance between the pulley centers. FIG. C shows, in left to right progression, the preferred steps used to attach the opposing, suitably terminated ends 26A,26B of the cable 17 to the first pin 9A (see also FIG. 1) to form a closed loop about the pulleys 16. Each end of the cable 17 exiting the first channel 21 of the first pin 9A is wrapped about the first pin body 20 and the dowel pins 22 to reduce the force transmitted to the end terminations 26A,26B of the cable 17 as the cable 17 is subjected to tensile loading. Such a reduction in transmitted tensile force by wrapping a cable about a cylinder is commonly known as "capstan effect".

FIG. 2D shows, in left to right progression, the steps used to attach the cable 17 to the second pin 9B. The attachment of the cable 17 to the second pin 9B also provides a means of taking up any extra cable length present due to cut-length variation and variation of the relative positions of the end terminations 26A, 26B. After insertion of the cable 17 into the second channel 21, the second pin 9B is rotated (shown by the arrows in FIG. 2D) so as to wind the cable 17 about the second pin 9B. During the progressive winding of the cable 17 about the second pin 9B, the cable 17 remains free to translate along the longitudinal axis of the second channel 21B so as to equalize the tension of the two portions of the cable 17 exiting the second pin 9B. Once the extra cable length has been completely removed from the closed loop of the cable 17 formed around the pulleys 16, additional rotation of the second pin 9B will serve to elongate the cable 17, imparting a tension to the cable 17 in a manner analogous to stretching an extension spring. The magnitude of this tension is directly proportional to the torque applied to rotate the second pin 9B. This proportionality allows a chosen pretension to be applied to the entire cable loop by applying an appropriate torque to the second pin 9B.

It is desirable to pretension the cable loop to limit the force excursions that the cable 17 experiences during operation of the gripper, as large amplitude excursions promote fatigue of the cable material. Should one jaw contact the surface of the gripped workpiece prior to the other jaw contacting the workpiece, the force generated by the elongate actuator attached to the non-contacting jaw will be transmitted to the contacting jaw through the cable loop. Cables are limited to transmitting force only by tension due to the flexible nature of the cable 17 preventing the transmission of compressive force. If the cable loop is not pretensioned, the entire force generated by the non-contacting elongate actuator will be carried as a tensile load by only one of the two portions of the cable loop that connect the first pin 9A to the second pin 9B. The other portion of the loop cannot transmit any of the force, as doing so would place the cable 17 in compression. In an adequately pretensioned cable loop system, the elongate actuator force will be equally divided between the two portions of the cable loop, with one portion of the loop experiencing an increase in tension, while the other portion experiences a corresponding decrease in tension. The total tension in one portion of the loop will therefore be equal to the pretension load plus one-half of the elongate actuator force, while the total tension in the other portion of the loop will be equal to the pretension load minus one-half of the elongate actuator force. Neither portion of the loop will therefore experience a force excursion amplitude greater than one-half of the elongate actuator force.

Pretensioning also provides the advantage of increasing the effective stiffness of the cable 17 by removing the air spaces present between the individual strands comprising the cable 17. The increased effective stiffness reduces the undesirable relative movement of one jaw with respect to the other jaw, which compromises the ability of the jaws to center the gripped workpiece.

The cable 17 can be comprised of any material suitable to handle the tensile loads that the cable 17 will experience during operation. Polymer cable offers the advantages of improved resistance to fatigue and corrosion, greater flexibility, improved dissipation of mechanical shock, and lower cost compared to traditional steel cable. Polymer cable suffers from lower stiffness and increased stress relaxation (loss of load while under sustained material deformation) when compared to steel cable. The lower comparative stiffness results in the polymer cable elongating more than steel cable under the same tensile load. The increased comparative stress relaxation makes it difficult to attach the polymer cable to other structures by mechanical crimping, as is typically done to attach steel cable.

A fastener 11B is tightened to retain the position of the second pin 9B, once the appropriate pretension has been established in the cable loop system.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A device for gripping an object comprising:
a main body including a first actuator bore, a second actuator bore, a first pin slot located transversely to said first actuator bore, and a second pin slot located transversely to said second actuator bore;
a first elongate actuator disposed within said first actuator bore of said main body and including a first traverse hole;
a second elongate actuator disposed within said second actuator bore of said main body and including a second transverse hole, said first elongate actuator and said second elongate actuator configured to translate opposingly to one another within said first actuator bore and said second actuator bore, respectively;
a first jaw driven by said first elongate actuator;
a second jaw driven by said second elongate actuator;
a first pin comprising a first pin body defining a first channel, said first pin configured to drive said first jaw by said first elongate actuator and disposed through said first transverse hole and said first pin slot;
a second pin comprising a second pin body defining a second channel, said second pin configured to drive said second jaw by said second elongate actuator and disposed through said second transverse hole and said second pin slot;
a pair of pulleys attached to said main body; and
a cable forming a closed loop around said pair of pulleys through said first channel and said second channel, said cable being affixed to said first channel to inhibit relative movement between said cable and said first channel.

2. The device of claim 1, further comprising a slot formed within said main body transversely to said first actuator bore and said second actuator bore substantially containing said cable, said pair of pulleys, said first channel, and said second channel.

3. The device of claim 2, further comprising a pivot pin located within each one of said pair of pulleys to allow said pair of pulleys free rotation about said pivot pins.

4. The device of claim 3, wherein said cable comprises a polymer.

5. The device of claim 4, wherein said first channel and said second channel are defined as a plurality of first pin walls and a plurality of second pin walls, respectively.

6. The device of claim 5, wherein said cable is wound around said second pin.

7. The device of claim 6, further comprising a plurality of dowel pins disposed along said first channel and said second channel configured to prevent cutting said cable during operation.

8. The device of claim 7, wherein one of said pair of pulleys is located at an end of said slot longitudinally opposite to the other one of said pair of pulleys.

9. The device of claim 8, further comprising:
a first end termination formed on an end of said cable; and
a second end termination formed on the other end of said cable.

10. The device of claim 9, wherein said first elongate actuator and said second elongate actuator are pistons.

11. The device of claim 10, wherein said first pin slot and said second pin slot longitudinally extend in parallel along a length between said pair of pulleys.

12. The device of claim 11, further comprising:
a first driver bar connecting said first jaw and said first pin; and
a second driver bar connecting said first jaw and said second pin.

13. The device of claim 12, wherein said cable is affixed to said first channel by said first end termination and said second end termination being wound around said first pin.

14. The device of claim 13, wherein said first end termination and said second end termination comprise one of a knotted end, a heat bloomed end, a material addition end, a crimped end, and an externally clamped end.

15. The device of claim 14, further comprising:
a first jaw slot formed in said main body configured to hold a rib formed on said first jaw and limit translation of said first jaw outside of said main body's longitudinal axis; and
a second jaw slot formed in said main body configured to hold a rib formed on said second jaw and limit translation of said second jaw outside of said main body's longitudinal axis.

16. The device of claim 15, further comprising a cover configured to hold said pair of pulleys within said slot.

17. The device of claim 16, wherein the length between said first pin slot and said second pin slot is equal to the diameter of one of said pair of pulleys.

18. The device of claim 17, wherein said pair of pulleys have the same diameter.

19. The device of claim 18, wherein said cable carries a pretension load greater than one half of an operating force provided by said first elongate actuator and said second elongate actuator.

20. The device of claim 19, wherein the length of said cable exceeds a perimeter distance formed by the circumference of said pair of pulleys and the distance between said pair of pulley's centers.

* * * * *